United States Patent [19]
Betts et al.

[11] Patent Number: 5,615,037
[45] Date of Patent: Mar. 25, 1997

[54] SUB-OCTAVE BANDPASS OPTICAL REMOTE ANTENNA LINK MODULATOR AND METHOD THEREFOR

[75] Inventors: Gary Betts, Westford; Frederick O'Donnell, Billerica; Kevin Ray, Burlington, all of Mass.

[73] Assignee: Massachusetts Institute of Technology, Cambridge, Mass.

[21] Appl. No.: 373,355

[22] Filed: Jan. 17, 1995

[51] Int. Cl.⁶ .......................... H04B 10/04; H04B 10/12
[52] U.S. Cl. ......................... 359/188; 359/173; 359/245
[58] Field of Search ........................... 359/127, 180–181, 359/183, 188, 245, 263, 173, 169; 385/2, 8, 15

[56] References Cited

U.S. PATENT DOCUMENTS

| | | | |
|---|---|---|---|
| 5,002,353 | 3/1991 | Johnson | 350/96.14 |
| 5,148,503 | 9/1992 | Skeie | 385/3 |
| 5,168,534 | 12/1992 | McBrien et al. | 385/3 |
| 5,227,908 | 7/1993 | Henmi | 359/181 |
| 5,249,243 | 9/1993 | Skeie | 385/3 |
| 5,278,923 | 1/1994 | Nazarathy et al. | 385/3 |
| 5,369,522 | 11/1994 | Tangonan et al. | 359/329 |
| 5,373,383 | 12/1994 | LaGasse | 359/181 |
| 5,448,396 | 9/1995 | Fukushima | 359/183 |

FOREIGN PATENT DOCUMENTS

| | | | |
|---|---|---|---|
| 90/05282PCT | 5/1990 | WIPO | |
| 91/06882 | 5/1991 | WIPO | G02B 6/26 |

OTHER PUBLICATIONS

Skeie, H., et al., "Linearization of Electro–optic Modulators by a Cascade Coupling of Phase Modulating Electrodes," *SPIE Integrated Optical Circuits*, 1583:153–164 (1991).

Izutsu, M., et al., "Picosecond Signal Sampling and Multiplication by Using Integrated Tandem Light Modulators," *Journal of Lightwave Technology*, LT–1(1):285–289 (Mar. 1983).

Betts, G. E., "Linearized Modulator for Suboctave–Bandpass Optical Analog Links," *IEEE Trans. MTT*, pp. 1–18 (Dec., 1994).

Gopalakrishnan, G.K., et al., "A LiNbO₃ Microwave–Optoelectronic Mixer with Linear Performance," *IEEE MMT–S Digest*, pp. 1055–1058 (1993).

(List continued on next page.)

*Primary Examiner*—Wellington Chin
*Assistant Examiner*—Kinfe-Michael Negash
*Attorney, Agent, or Firm*—Hamilton, Brook, Smith & Reynolds, P.C.

[57] ABSTRACT

An electro-optical modulation device comprises a first Mach-Zehnder interferometric modulator. This modulator has balanced optical power in each arm to intensity modulate an optical carrier signal in response to an information signal. The invention also includes a second Mach-Zehnder interferometric modulator that is in a cascade connection with the first modulator and also has balanced optical power in each arm. This second modulator receives the optical carrier signal from the first modulator and also intensity modulates the optical carrier signal in response to the information signal. In another embodiment, the electro-optical modulation device comprises an electro-optical modulator, for intensity modulating an optical carrier in response to an electrical signal, and a reflective termination. The termination reflects the intensity modulated optical carrier signal to travel back through the electro-optical modulator. As a result, the modulation effect of the modulator is effectively doubled. Either embodiment is useful for applications that involve bandwidths of less than one octave, for which the embodiments can be easily optimized. The best examples are links for remote antennas, the most notable exception being cable television. For these sub-octave-bandpass links, second-order distortion does not present a problem since these spurious signals fall outside the band of interest. As a result, the second-order distortion control constraint can be sacrificed in an effort to negate third-order distortion and remediate other problems. This trade-off is not available in broadband cable applications.

27 Claims, 8 Drawing Sheets

OTHER PUBLICATIONS

Brooks, J.L., et al., "Implementation and Evaluation of a Dual Parallel Linearization System for AM–SCM Video Transmission," *Journal of Lightwave Technology*, 11(1):34–41 (Jan., 1993).

Chang, W.S.C., "Analog Modulation with Large Linear Dynamic Range," (Micro Project Report No. 91–020). University of California, La Jolla, CA, (1991–2).

Johnson, L.M., et al., "Reduction of Intermodulation Distortion in Interferometric Optical Modulators," *Optics Letters*, 13(10):928–930 (Oct., 1988).

Korotky, S.K., et al., "Dual Parallel Modulation Schemes for Low–Distortion Analog Optical Transmission," *IEEE Journal on Selected Areas in Communications*, 8(7):1377–1380 (Sep., 1990).

Farwell, M.L., et al., "Increased Linear Dynamic Range by Low Biasing the Mach–Zehnder Modulator," IEEE Photonics Technology Letters, 5(7):779–782 (Jul., 1993).

Farwell, M.L., et al., "Increased Linear Dynamic Range by Low Biasing the Mach–Zehnder Modulator," *PSAA–III, The Third Annual DARPA Symposium on Photonics Systems for Antenna Applications*, Monterey, CA (Jan. 20–22, 1993) Abstract only.

Betts, G.E., et al., "Sub–Octave–Bandwidth Analog Link Using Linearized Reflective Modulator," *PSAA–IV, The Fourth Annual ARPA Symposium on Photonics Systems for Antenna Applications*, Monterey, CA (Jan. 18–21, 1994) Abstract only.

Betts, G.E., et al., "Improvements in Passive, Low–Noise–Figure Optical Links," *PSAA–III, The Third Annual DARPA Symposium on Photonics Systems for Antenna Applications*, Monterey, CA (Jan. 20–22, 1993) Abstract only.

SUB-OCTAVE BANDPASS OPTICAL REMOTE ANTENNA LINK MODULATOR AND METHOD THEREFOR

GOVERNMENT SUPPORT

The invention described herein was supported in whole or in part by Grant No: F 19628-90-C-0002 from the United States Air Force.

BACKGROUND OF THE INVENTION

Electro-optic modulators are used in analog optical communications systems such as those found in cable TV or antenna remoting applications. The analog specifications lead to strict signal-to-noise ratio and spurious-free dynamic range requirements. Most known modulators do not have sufficient performance for many applications.

There are many types of modulators that convert an applied voltage related to the information signal to be transmitted into intensity modulation of an optical carrier signal. A subset is termed "mode interference modulators." These devices, such as interferometric modulators, convert some optical phase ratio between modes into intensity changes. These criteria exclude devices that directly attenuate the light such as cutoff modulators or electro-absorption modulators. Mode interference modulators include devices such as the directional coupler modulator, versions of the "TIR" modulator based on single-mode waveguides, and the mode evolution modulator.

The most commonly used modulator today is the Mach-Zehnder (MZ) interferometric modulator, see FIG. 1. An input optical carrier is coupled into an input, single-mode, optical waveguide. This light is divided between two paths, arms of the modulator, and then recombined. The relative optical phase of the carrier in the two paths is controlled by some type of optical phase modulation in one or both arms. The intensity of the light at the output is controlled by the relative phase of the carrier signal in each arm.

Most externally modulated optical analog links use a single MZ modulator that amplitude or intensity modulates an optical carrier signal in response to an applied voltage, which is related to the information bearing signal. This modulator is biased at quadrature, $\phi_1=90°$. The bias point $\phi_1$ is quiescent optical phase difference between the arms of the modulator. A bias point of 90° gives 0 second-order distortion and maximum link electrical gain. The modulators average (dc) optical transmission is 0.5 at this bias point. This yields a link with an adequate performance in many applications.

SUMMARY OF THE INVENTION

Many applications involve bandwidths of less than one octave. The best examples are links for remote antennas, the most notable exception being cable television. For these sub-octave-bandpass links, second-order distortion does not present a problem since these spurious signals fall outside the band of interest. As a result, the second-order distortion control constraint can be sacrificed in an effort to negate third-order distortion and remediate other problems. This trade-off is not available in broadband cable applications.

The present inventive modulation device combines two separate lines of development. The operation of a single MZ modulator at a bias point close to its transmission minimum and linearization of its transfer function in the band of interest. By using a bias point in the range of $90°<\phi_1<180°$, the link noise figure and the average detector current can be reduced, with the cost of high second-order distortion. These advantages come about because the primary link noise sources fall faster than the link gain as the bias point is increased from 90°.

Modulators designs are available that produce less third-order distortion than the single MZ. These architectures, however, generally are complex, difficult to control, cause significant noise figure penalties, and require non-standard modulators. Parallel connection of MZ, with a second MZ of reduced extinction, i.e. an optical power imbalance between the arms so that transmission is never zero, produces a linearized modulator that avoids the optical power splitting/combining difficulties of parallel MZ architectures. These reduced-extinction series MZ designs, require two critical control adjustments, incur a noise figure penalty of approximately 6 dB compared with a single MZ, and cannot be manufactured from off-the-shelf components.

According to the present invention, cascade connected MZ modulators can be simplified and performance improved by removing the second-order distortion minimization constraint. As a result, there is no requirement for reduced extinction on one of the modulators. Thus, two standard, equal power in arms, MZ's can be used. Moreover, there is only one critical adjustment which is the bias point of one of the modulators. Further, the noise figure of the length using this type of modulator can actually be lower than the figure for a link using a single MZ biased at quadrature. Finally, the bias points of the modulators can be set so that the average detector current is substantially reduced while link performance improved.

In view of the forgoing, according to one aspect, the invention features an electro-optical modulation device. This device comprises a first Mach-Zehnder interferometric modulator. This modulator has balanced optical power in each arm to intensity modulate an optical carrier signal in response to an information signal. The invention also includes a second Mach-Zehnder interferometric modulator that is in a cascade connection with the first modulator and also has balanced optical power in each arm. This second modulator receives the optical carrier signal from the first modulator and also intensity modulates the optical carrier signal in response to the information signal.

Since many applications involve sub-octave links, the first and the second modulator are collectively tuned to only minimize third-order distortion since this distortion will fall into the band of interest. To achieve this function, one of the first and second modulators is biased between $90°<\phi<270°$ to decrease total optical power.

The present invention can also be characterized in the context of a method. As a result, in general, according to another aspect, the invention features a method for transmitting an information signal over an optical fiber link. An electro-optical modulator facilitates this transmission and includes first and second Mach-Zehnder interferometric modulators, which are cascade connected to each other. Specifically, the method comprises generating an optical carrier signal. This is most commonly accomplished using a laser device.

The optical carrier signal is equally divided between the arms of the first modulator. The modulator generates a relative phase shift between the portions of the optical carrier signal in each of its arms in response to the information signal. And, the portions of the optical carrier signal are recombined. Subsequently, the optical carrier is again divided between the arms of the second modulator. Again, a relative phase shift between the portions of the optical carrier signal in each of the modulator's arms is produced in response to the same information signal. Finally, the now-intensity modulated optical carrier is recombined after the second modulator. Preferably, as described earlier, the first modulator and the second modulator are collectively configured to minimize only third-order distortion.

The present invention can be further characterized in the context of an inventive communications link. As a result, according to another aspect, the invention features a sub-octave remote antenna optical communications link. Basically, this link transmits information bearing signals between an antenna and a control facility. The link can extend in either direction, that is, from the control facility to the antenna where the information signal is then broadcast, or the antenna can detect the information-bearing signal and then transmit this signal over the link to the control facility. In either case, the link comprises an electrical input device providing an information-bearing electrical signal. A laser then generates the optical carrier signal. First and second electrical-optical modulators intensity modulate the optical carrier signal in response to the electrical signal. These modulators are in a cascade connection with each other. An optical fiber cable conveys the intensity modulated optical signal between the antenna and the control facility. Finally, an electro-optical detector detects the intensity modulated optical signal and converts it back into an electrical signal.

Preferably, the modulators are Mach-Zehnder-type modulators, and, for ease of construction and manufacture, the modulators have balanced optical power in each arm. Modulators having these characteristics are the most commonly available in the industry.

In many applications such as cellular phones or microwave antennas, the remote antenna link will be a sub-octave bandpass optical link. As a result, the first and second modulators can be collectively tuned to minimum only third-order distortion.

A second embodiment of the electro-optical modulation device of the present invention essentially modulates the optical carrier signal twice in effectively two modulators. This is achieved, however, structurally with only a single modulator. Basically, a mirror is placed after a single Mach-Zehnder modulator to reflect the optical signal back through it. As a result, many of the advantages described associated with the cascade connected modulators above can be achieved with half the structure.

As a result, according to still another aspect, the invention features an electro-optical modulation device. This device comprises an electro-optical modulator, for intensity modulating an optical carrier in response to an electrical signal, and a reflective termination. The termination reflects the intensity modulated optical carrier signal to travel back through the electro-optical modulator. As a result, the modulation effect of the modulator is effectively doubled.

Since the Mach-Zehnder modulator only has a single input and output, as opposed to, for example, a modulator using waveguide coupling sections, a separating device is useful for coupling the optical carrier signal into the modulator and for isolating the intensity modulated carrier signal from the modulator input signal on the output link. This separator can ideally be an optical circulator. Alternatively, a directional coupler is useful since it provides two separate outputs. Further, the interferometer is preferably a Mach-Zehnder type in which the bias angle is set to approximately 105°. This results in a minimization of only third-order distortion, yielding special applicability to sub-octave remote antenna optical communications links.

The above and other features of the invention including various novel details of construction and combinations of parts, and other advantages, will now be more particularly described with reference to the accompanying drawings and pointed out in the claims. It will be understood that the particular method and device embodying the invention is shogun by way of illustration and not as a limitation of the invention. The principles and features of this invention may be employed in various and numerous embodiments without the departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4A is the third-order-intercept optical modulation depth, FIG. 4B is the linear transfer co-efficient normalized by total input electrical power, FIG. 4C is the d.c. transmission coefficient, and FIG. 4D is the second modulator bias point $\phi_2$;

FIG. 5A shows third-order-intermodulation-free dynamic range, FIG. 5B shows the noise figure, FIG. 5C shows the electrical gain, FIG. 5D shows the average, d.c., current for the photodetector, each as a function of r, the ratio of phase modulation depths;

FIG. 8A is a plot of average photocurrent as a function of Fullon photocurrent and 8B is a plot of noise figure and dynamic range;

DETAILED DESCRIPTION OF THE PREFERRED EMBODIMENTS

Figure 1:
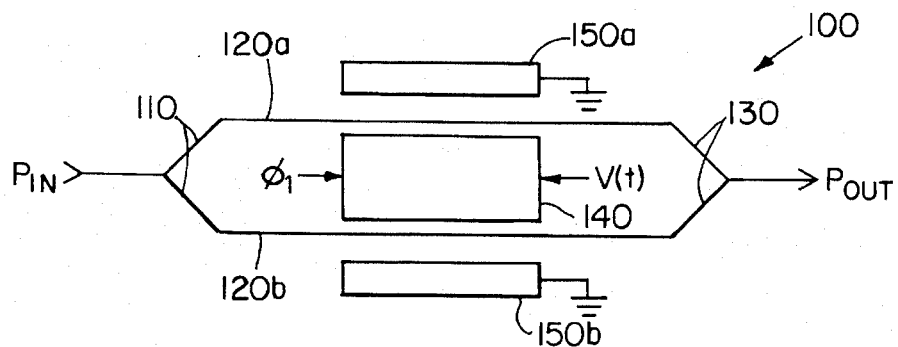
FIG. 1 is a schematic diagram of a prior art Mach-Zehnder interferometric modulator.

Turning now to the drawings, FIG. 1 is a schematic representation of a prior art MZ modulator 100. Specifically, splitting of the input optical carrier signal $P_{in}$ is provided by a simple Y-branch 110. Light that is not transmitted through the output waveguide is radiated away. The modulator can also be made with a directional coupler instead of a Y branch at the input and/or output. Directional coupling devices are generally the same as the Y-branch devices, but there are two complementary outputs so no light is radiated; the light is just switched from one output to the other.

Portions of the carrier signal propagate through both arms 120a, 120b. The ratio of the optical power in the two arms can be equal or any other value. As a practical matter, if an unequal split is desired, it is easier to control the split with a coupler than with the Y-branch. Almost all modulators commonly manufactured, however, use equal power splitting between arms.

The modulators can be built on a variety of substrates, and a variety of modulation mechanisms could be used to convert an applied signal to optical phase modulation. The most commonly used substrate material is lithium niobate, and the most commonly used phase modulation method is the linear electro-optic effect which converts an applied voltage v(t) linearly to a phase delay. Specifically, electric fields between the center electrode 140 and the arm electrodes 150a, 150b change the index of refraction of the arms 120a, 120b, which changes the optical path lengths. The nonlinearity in the intensity modulation comes because the output intensity is a nonlinear function of the phase difference between arms.

Figure 2:
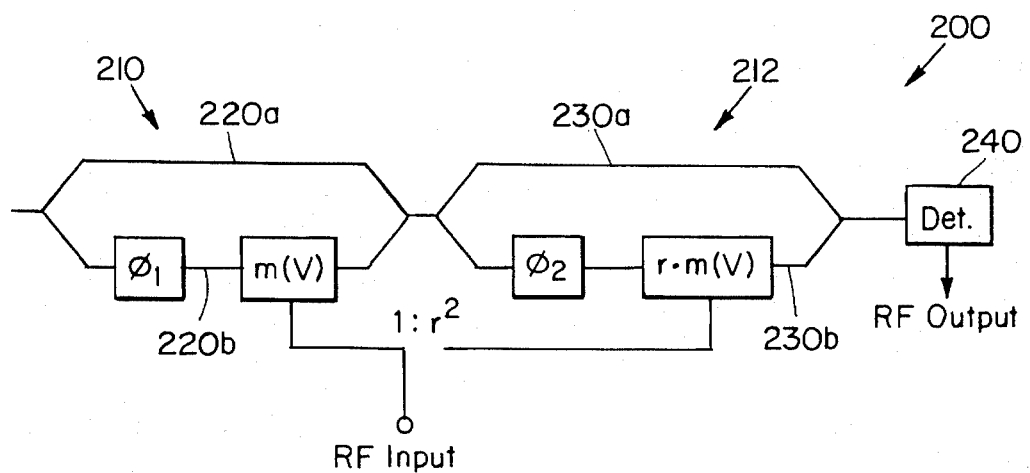
FIG. 2 is a schematic diagram of cascade-connected Mach-Zehnder modulators device of the present invention.

FIG. 2 shows an electro-optical modulation device 100 constructed according to the principles of the present invention. Basically, the device comprises two standard Mach-Zehnder interferometric modulators 210, 212 in a cascade connection with each other. More specifically, an unmodulated input optical carrier signal $P_{in}$ is equally divided at the Y-branch of the first Mach-Zehnder modulator between its two arms 220a, 220b. A relative phase shift is generated between the portions of the optical carrier frequency in each arm of this first modulator. The shift is determined by a bias angle phase shift $\phi_1$ and a second phase shift m(v) which is a function of the applied voltage, the RF input. A converging Y-branch combines the portions of the optical carrier signal in each arm of the first modulator 210. The combination of these two signals converts the relative phase shift between the arms into intensity modulation.

The intensity modulated optical carrier signal is provided into the diverging Y-branch of the second Mach-Zehnder modulator 212. Again, the optical carrier signal is equally divided between the two arms 230a, 230b of the second MZ modulator. Here, a second relative phase shift between the portions of the optical carrier signal in each arm is introduced. Specifically, a phase shift corresponding to a second biasing angle $\phi_2$ and a phase shift, which is a function of the applied voltage used for the first modulator, RF input, are again introduced. These relative phase shifts are again converted into intensity modulation by the converging Y-branch of the second modulator 212. This generates the final intensity-modulated optical carrier signal.

The first and second MZ modulators 210, 212 of the modulation device 200 are collectively tuned to reduce only third-order distortion. This third-order reduction can be intuitively understood by considering the contributions of the cubic terms of the electro-to-optical transfer function of the modulating device. The transfer function is given by:

$$\frac{P_{out}}{P_{in}} = f[m(v)], \quad (1)$$

where $P_{in}$ and $P_{out}$ are the input and output optical power, and m is a dimensionless, linear function of the applied voltage v. The output current from the link detectors is $i_0 f[m(v)]$, where $i_0$ is the current when the modulator is set to maximum transmission (f=1); $i_0$ includes the laser power, optical losses, and detector responsivity. For small signals (m<<1), the transfer function (1) can be expanded in terms of m as:

$$f(m) = \sum_n c_n m^n \quad (2)$$

For an input signal $$m = \sum_p m_p \sin\omega_p t \quad (3)$$

the link output current is $$i = i_{avg} \left( 1 + \sum_p M_p \sin\omega_p t + \sum_j M_j \sin\omega_j t \right), \quad (4)$$

where M represents the optical modulation depth and the $\omega_j$ are spurious frequencies, present in the output but not in the input.

Figure 3:
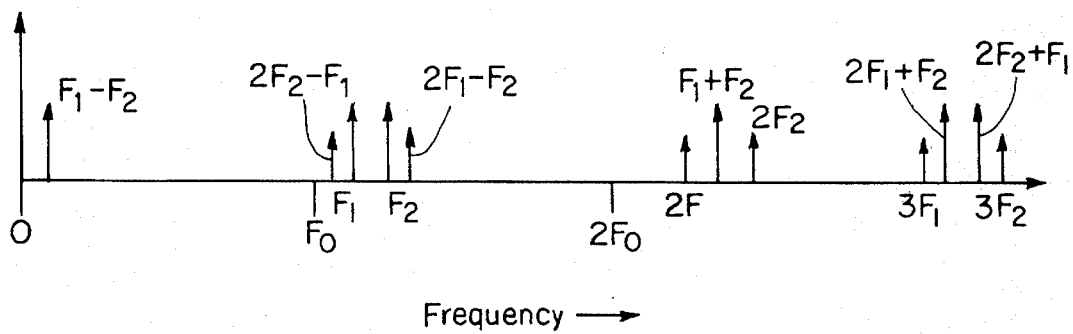
FIG. 3 is a plot of signal power as a function of frequency illustrating the frequency relationship between the fundaments of the RF signal and second and third-order distortion.

FIG. 3 illustrates the frequency spectrum output of signal R.F. output for a two tone input signal of frequencies $f_1$ and $f_2$. The illustrated system is sub-octave since the fundamentals $f_1$, $f_2$, are found entirely within a band in which the highest frequency 2 $f_0$ is less than twice the lowest $f_0$. Contributions to the third-order distortion are present from the cubic terms of each MZ individually 3 $f_1$, and 3 $f_2$. Further, there is a contribution from the product of the linear term of one modulator with the quadratic term of the other 2 $f_2$-$f_1$, and 2 $f_1$-$f_2$. As a result, third-order distortion can be entirely negated by choosing the modulators' 210, 212 parameters collectively so that the cubic product terms cancel. The linear terms from the individual modulators should add to maximize the fundamental.

The detector 240 output current from a link using the dual series MZ is $$i = \frac{1}{4} i_0 1 + \cos[\phi_1 + m(v)]1 + \cos[\Phi_2 + r \cdot m(v)] \quad (5)$$

where $\phi_1$ and $\phi_2$ are the bias points and other quantities have been defined above. This can be expanded in powers of m as described by equations (2).

The third-order distortion can be reduced by requiring $c_3=0$. Since three free variables, r, $\phi_1$, and $\phi_2$ are present two can be chosen to optimize other aspects of modulator performance, and the third can be set from the $c_3=0$ condition. The relative phase of the RF signal applied to the two modulators must be the same. At high frequencies, the optical propagation time between the modulators must be considered, i.e., r must be a real number.

Figure 4:
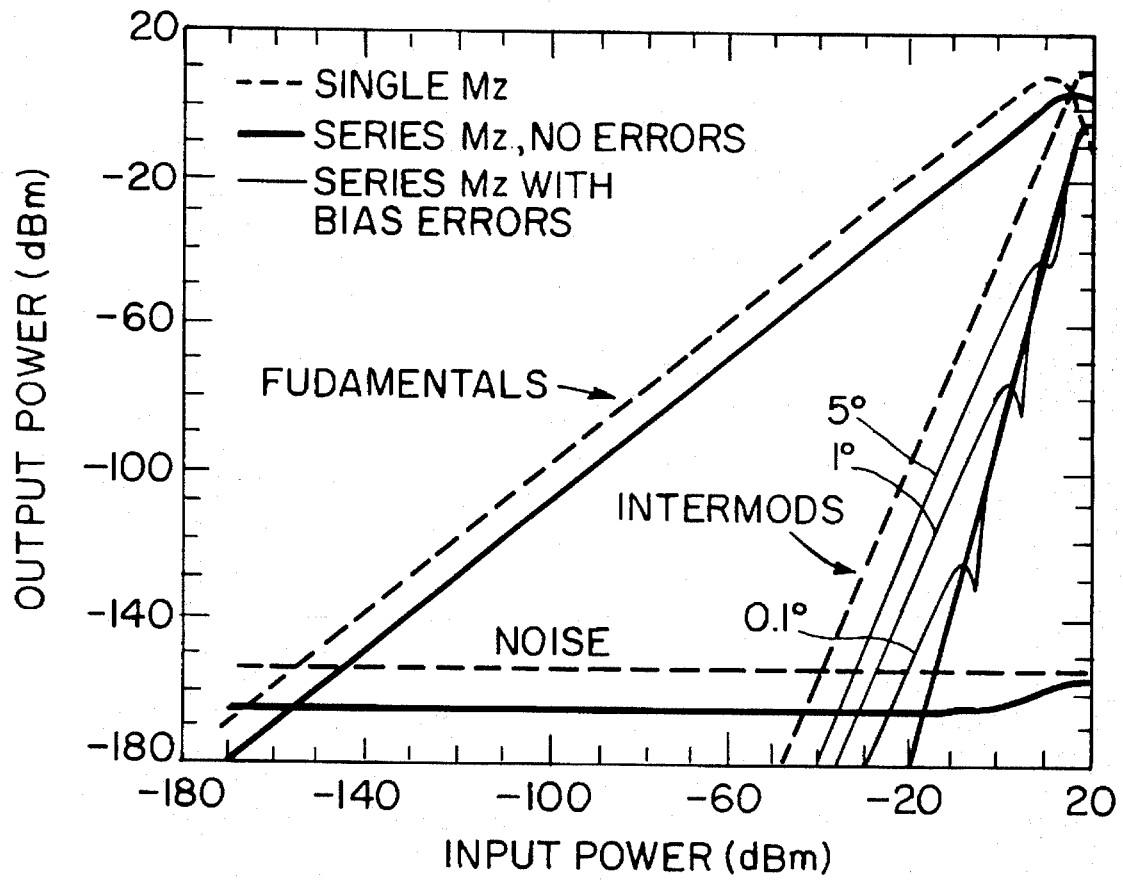
FIG. 4 is a graph of the output power (dBm) as a function of input power (dBm) for fundamental and third-order-intermodulation signals, and output noise, of links using the cascade-connected modulators of the present invention and a single standard. Mach-Zehnder interferometric modulator (the parameters used were $\phi_1=60°$, $\phi_2=153.61°$, R=3.16 for the cascade MZ and $\phi_1=90°$ for the single MZ.

FIG. 4 shows how one cascade series MZ design of the present invention compares to a single MZ biased at quadrature. When the series MZ is designed so $c_3=0$, the third-order intermodulation signals fall as the fifth power of the input power of the information signal, which gives the series MZ a larger dynamic range. Because of this property, the amount of dynamic range improvement depends upon the dynamic range of the single MZ link: links that have a large dynamic range with a single MZ will show greater improvement in dynamic range when a series MZ is used than will links with a small dynamic range. This is easiest to see in FIG. 4 by considering a larger noise bandwidth, which would move the noise floor upward. It is also true when the dynamic range is changed by changing the non-modulator-related link design parameters.

The rms electrical power output from the link for any one of the frequency components in (5) is $$p = \frac{1}{2} i_{avg}^2 M^2 R_d, \tag{6}$$

where $R_d$ is the detector load resistance; the link's output third-order-intercept point is $$p_{IP3} = \frac{1}{2} i_{avg}^2 M_{IP3}^2 R_d. \tag{7}$$

The output noise (in a 1 Hz bandwidth) from the link is $$N_o = F_R kT + 2ei_{avg} R_d + \Re i_{avg}^2 R_d, \tag{8}$$

where $F_R$ is the receiver noise figure, k is Boltzmann's constant, T=290K is the standard noise temperature, e is the electronic charge, and $\Re$ is the optical relative intensity noise (RIN) at the detector. The first term is the receiver noise, the second is the shot noise, and the third is the noise due to optical intensity noise. The third-order-intermodulation-free dynamic range is $$DR = \left(\frac{p_{IP3}}{N_o B}\right)^{\frac{n-1}{n}} = \left(\frac{2F_R kT}{i_0^2 R_d} \frac{1}{c_0^2 M_{IP3}^2} + \frac{4e}{i_0} \frac{1}{c_0 M_{IP3}^2} + 2\Re \frac{1}{M_{IP3}^2}\right)^{-\frac{n-1}{n}} B^{-\frac{n-1}{n}} \tag{9}$$

where B is the noise bandwidth and n is the degree of the dependence of the third-order-intermodulation signal power on the input signal power. To calculate the link gain and noise figure, we need to define a relation between $m_p$ and the electrical input power. The modulator response K is defined as $$K = \frac{m_p^2}{p_{in}}, \tag{10}$$

where $p_{in}$ is the rms electrical input power at the frequency $\omega_p$. The noise figure is then $$F = \frac{N_0}{GkT} = \frac{2F_R}{i_0^2 R_d} \frac{1}{Kc_1^2} + \frac{4e}{i_0 kT} \frac{c_0}{kc_1^2} + \frac{2\Re}{kT} \frac{c_0^2}{Kc_1^2}, \tag{11}$$

where G is the link electrical gain.

Equations (9) and (11) relate the key link performance measures to the modulator parameters $c_0$, $c_1$, K, n, and $M_{IP3}$. The parameters to optimize depend upon which noise source is the limiting factor in a given application. The parameters $c_0$, n, and $M_{IP3}$ are independent of the choice of m(v); however, $c_1$ and K do depend on how m(v) is chosen. When comparing the noise figure of different modulator types, m(v) must be chosen in a consistent way for all if $c_1$ and K are to be directly comparable.

In a single MZ modulator (as shown in FIG. 1), an applied voltage produces an optical phase difference between its arms, which in turn produces intensity modulation when the light from the two arms is combined. A signal v+vp·sin(ωt), where $m_p = \pi v_p/v_\pi$ is the phase modulation depth (PMD); $v_\pi$ is the voltage required to change the phase difference between arms by π. With this definition, for small signals, a single MZ produces an optical modulation depth $M_p = m_p$. The response of a single MZ is $K_s = m_p^2/P_{ins}$, where $P_{ins}$ is the RF power input to the single modulator. For a dual MZ (either series or parallel), the second MZ has the same $K_s$, but is driven with $r^2$ as much electrical power, so it has a PMD of $r \cdot m_p$. With these definitions, the response of a modulator consisting of a combination of one or two MZs is $$K = K_s \frac{1}{1+r^2} \tag{12}$$

Links with higher dynamic range have the noise floor at smaller phase modulation depth (PMD), where the difference between third- and fifth-degree dependence is greater. To calibrate FIG. 4, $m_p = 1$ at +10 dBm input for the single MZ, and $r \cdot m_p = 1$ at +10.4 dBm for the series MZ. Thus, the amount of dynamic range improvement available from this modulator (or any designed using the $c_3 = 0$ scheme) depends critically on the parameters of the link in which it is used.

Also shown in FIG. 4 are the third-order-intermodulation signals for some errors in bias point from the $c_3 = 0$ solution (the noise floor and the fundamental signals are only slightly affected by these errors). These represent cases where $c_3$ is opposite in sign to $c_5$ so the third- and fifth-degree contribution to the third-order distortion cancel at a particular PMD. For PMDs above this cancellation point, the fifth-degree term dominates; below it, the third-degree term dominates. These provide higher dynamic range than the $c_3 = 0$ solution is the noise floor is above this cancellation point.

The modulator behaves differently as a function of design. Values for r and $\phi_1$ were chosen, then $\phi_2$ was determined for the $c_3 = 0$ condition. The link output signals were then calculated by taking the Fourier transform of equation (5) with $m(v) = m_p[\sin(\omega_1 t) + \sin(\omega_2 t)]$, and the values of $c_0$, $c_1$, and $M_{IP3}$ were calculated from the transform result. FIGS. 5A–D show how the modulator parameters vary with design choices. It can be seen from FIG. 5D that there is a solution for any value of r and $\phi_1$.

Figure 5A:
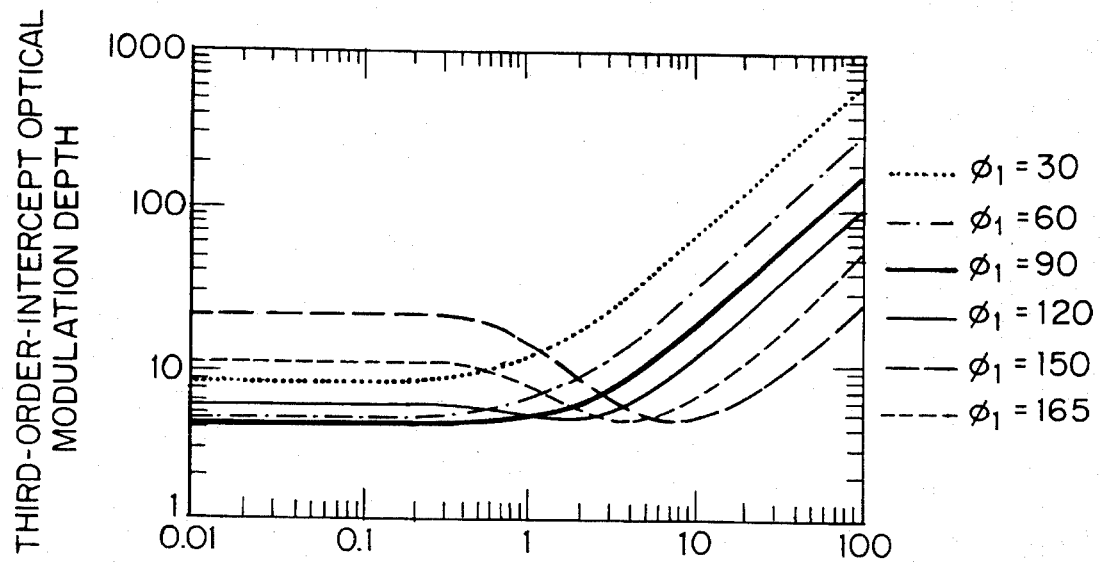
FIGS. 5A–5D illustrate different modulator design choices and the effect on modulator performance measures, specifically, in each case the independent variable is the ratio r of phase modulation depths.
Figure 5B:
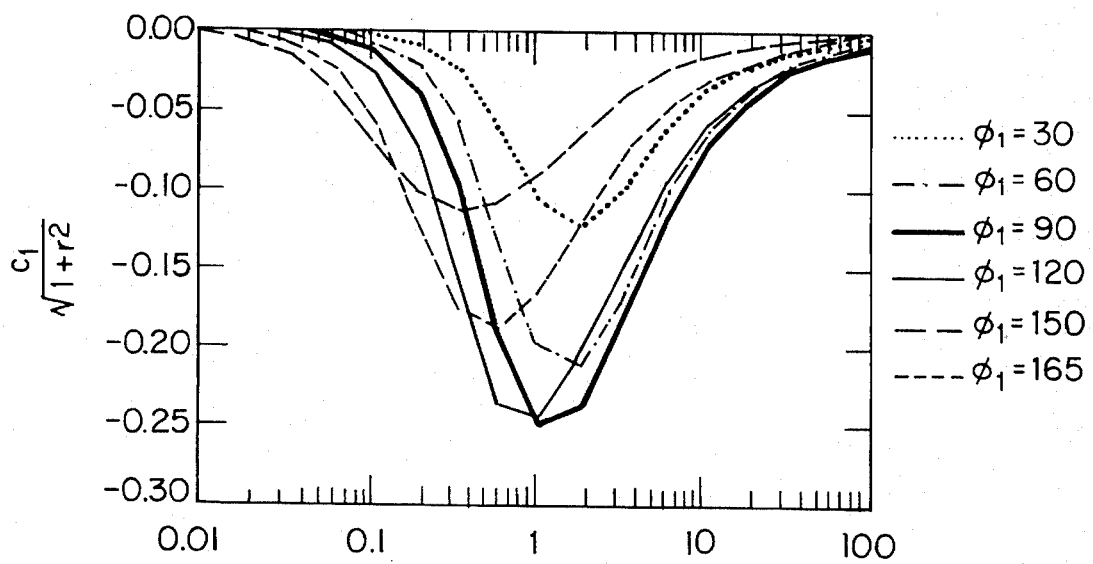
Figure 5C:
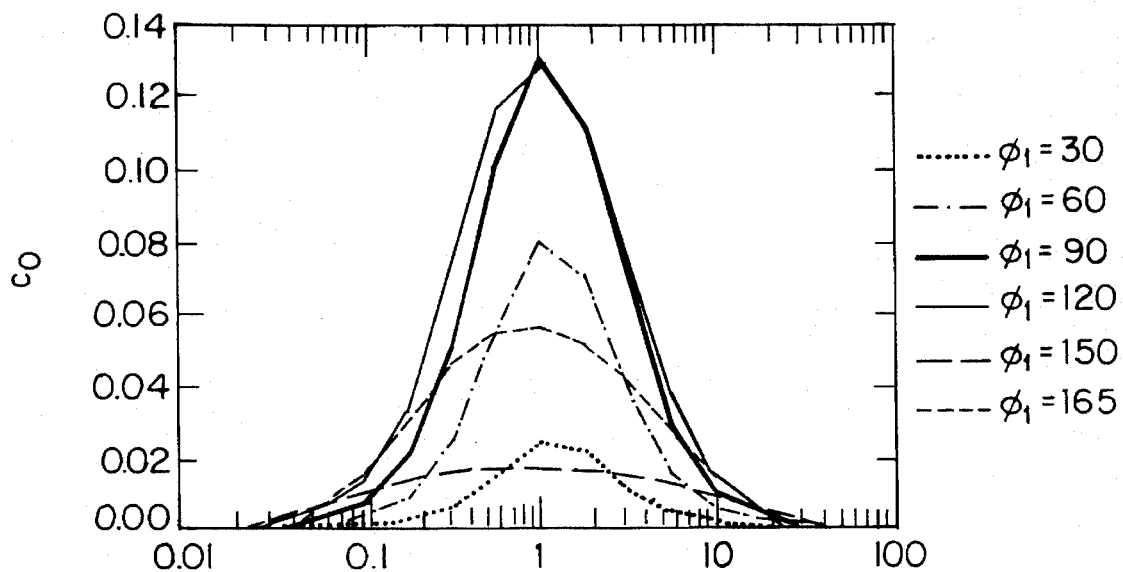
Figure 5D:
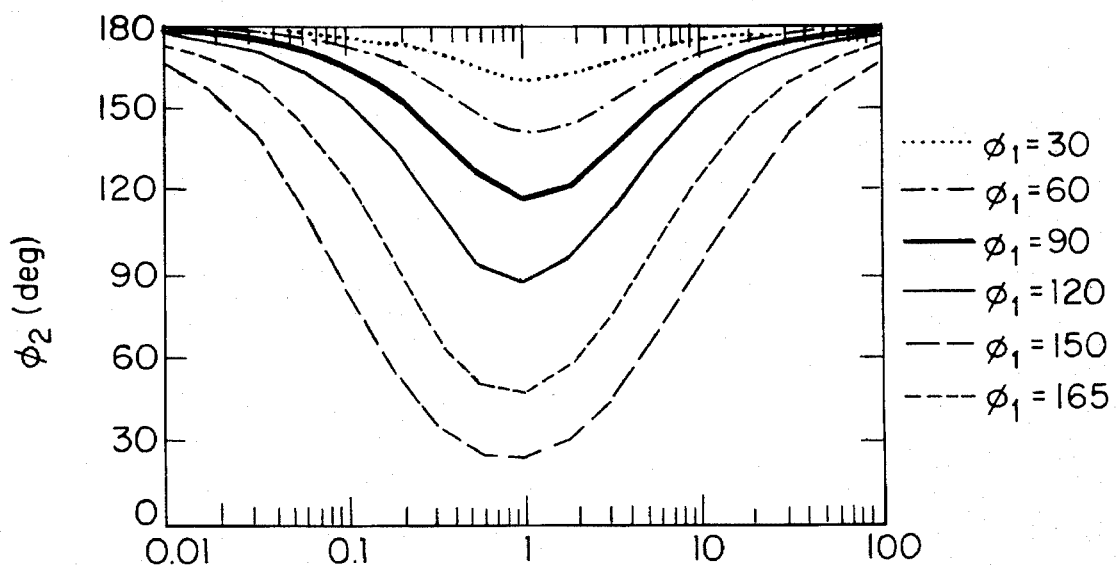

The modulator parameters shown in FIGS. 5A–D completely define the device's performance in suboctave links, but there are several different combinations of those parameters that can be significant, depending on the noise source and link performance measure present. In FIG. 5C, the average optical transmission is given by $c_0$, and is a maximum for r=1 and $\phi_1$ near 90°. In FIG. 5B, the link electrical gain is given by $c_1^2(1+r^2)^{-1}$, which is a maximum for the same parameter values that maximize $c_0$. In FIG. 5A, the value of the third-order intercept optical modulation depth $M_{IP3}$ can become quite large, going to infinity at large r. This is not due to the linearization of the modulator transfer function, but is due to $c_0$ decreasing faster than $c_1(1+r^2)^{0.5}$ at large r so that the optical modulation depth for a fixed PMD increases; the single MZ shows the same behavior at $\phi_1$ approaches 180°.

The principle application for the above-described electro-optical modulating device is in sub-octave communications links where the second-order distortion will fall outside of the band of interest. Generally, this qualification excludes such broad-band applications as cable television. One application, however, that can benefit from the present invention is communication links for remote antenna systems. These systems are used, for example, at cellular phone cell stations or microwave relays where a control facility is usually located some distance from a remote antenna. Electrical links across this distance can be expensive due to high frequency signal degradation stemming from the distances involved.

Figure 6:
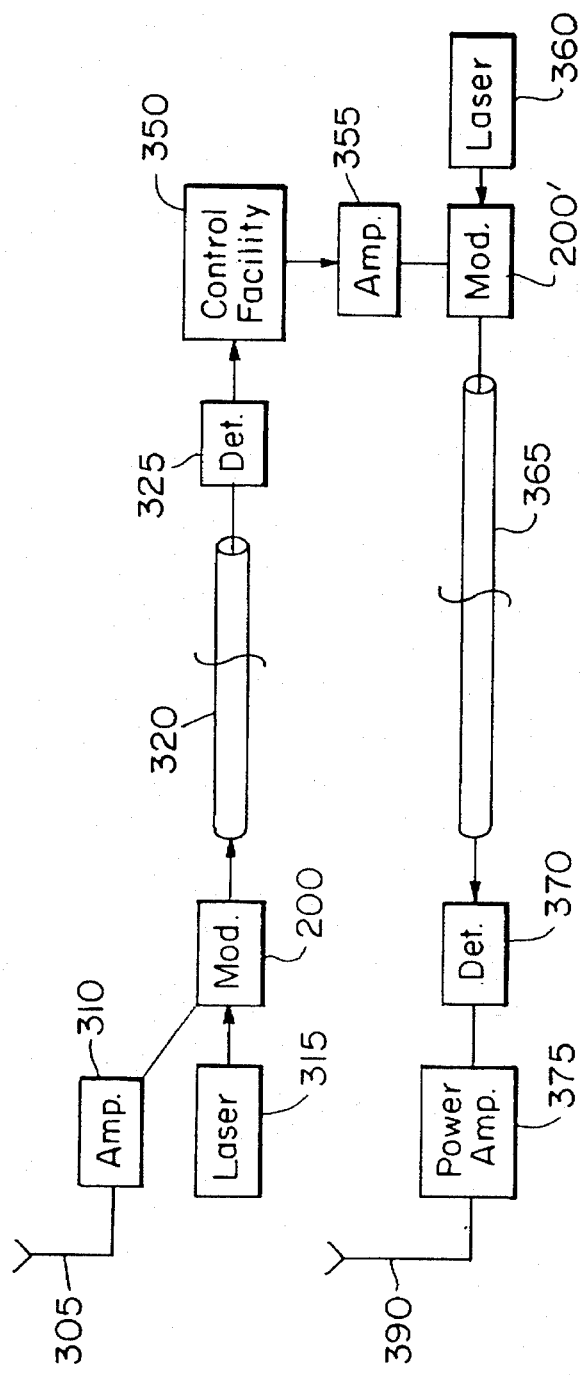
FIG. 6 shows a sub-octave remote antenna link for a cellular phone system.

FIG. 6 is a block schematic diagram of a sub-octave remote antenna optical communications link for a cellular phone cell station. Here, phone communications are detected by a receiving antenna 305 and amplified in an amplifier 310. The radio frequency output from this amplifier 310 is received into the inventive electro-optical modulation device 200. A laser 315 provides an optical carrier signal to the modulator 200, which intensity modulates optical carrier signal in response to the information bearing radio frequency signal. The intensity modulated carrier is coupled into an optical fiber cable 320 that extends between the antenna 305 and a control facility 350. A detector 320 at the end of the optical fiber cable 320 detects the intensity modulated optical carrier signal and provides the de-modulated radio frequency signal to the control facility 350.

The inventive communications link can also be used to send information from the control facility 350 to the remote broadcast antenna. Similarly, the information bearing electrical signal from the control facility 350 is amplified and used as the modulating RF signal. This modulator 200' also receives an optical carrier signal from a laser 360 and the intensity modulated optical carrier signal is transmitted across a second fiber optic cable 365. A detector 370 and power amplifier 375 convert the demodulated information bearing signal to power the broadcast antenna 390.

The following table shows how this modulator 200 can be optimized to excel in sub-octave communication links.

as without RIN, though). In the case where the average detector current $i_{avg}=c_0 i_0$ is limited to a fixed maximum value, examination of equations (9) and (10) shows that the modulator criteria for best performance are the same as for the RIN-dominated case. In real systems, more than one noise source is usually significant, but the Table helps one understand where the modulator works best.

Space does not permit plotting all of the performance measure in the table as a function of modulator design, but we can examine the series MZ performance in a typical high-performance link. FIGS. 7A–D show the dynamic range FIG. 7A, noise figure FIG. 7B, gain FIG. 7C, and average detector current FIG. 7D as a function of the modulator design for a link and with $K_s=100$ W$^{-1}$, $R_d=50\Omega$, no RIN, $F_R=0$ dB, and $i_0=50$ mA. (FIGS. 4, 8, 9 also use these link parameters, except that $i_0$ varies in FIG. 8. A 1 km link using a 140 mW diode-pumped Nd:YAG laser, a modulator with a total insertion loss of 3 dB made with MZs having $v_\pi=3.1$ V, a detector with 0.9 A/W responsivity, and

TABLE I

COMPARISON OF MODULATOR PERFORMANCE FOR VARIOUS SOURCES (USING DIMENSIONLESS MODULATOR FIGURES OF MERIT

| PERFORMANCE MEASURE FIGURE OF MERIT | 2ND-ORDER DISTORTION | 3RD-ORDER SLOPE n | NOISE SOURCE | | | | | |
|---|---|---|---|---|---|---|---|---|
| | | | RECEIVER | | SHOT | | RIN | |
| | | | DR$^{(1)}$ $c_0^2 M_{IP3}^2$ | F $\frac{1+r^2}{c_1^2}$ | DR $c_0 M_{IP3}^2$ | F $c_0 \frac{1+r^2}{c_1^2}$ | DR $M_{IP3}^2$ | F $c_0^2 \frac{1+r^2}{c_1^2}$ |
| SINGLE MZ, $\phi_1 = 90°$ | NO | 3 | 2 | 4 | 4 | 2 | 8 | 1 |
| SINGLE MZ, $90° \leq \phi_1 < 180°^{(2)}$ | YES | 3 | 2 | 4 | 8 | 1 | $\infty$ | 0 |
| DUAL PARALLEL MZ | NO | 5 | 0.34 | 45 | 0.67 | 22.6 | 1.35 | 11.2 |
| SERIES MZ$^{(2)}$ | YES | 5 | 0.39 | 16 | 8 | 1 | $\infty$ | 0 |

$^{(1)}$DR refers to third-order-intermodulation-free dynamic range
$^{(2)}$Single MZ, $90° \leq \phi^1 < 180°$ and Series MZ are optimized differently for receiver noise than for shot noise and RIN There are six basic optimization criteria: Three possible noise sources and two link performance measures (F and DR). Equations (9), (10), and (12) have been used to determine the modulator figure of merit appropriate to each case. In the receiver-noise-limited case, the best optimization for the series MZ is r=1 and $\phi_1$ near 90° so $c_1^2/(1+r^2)$ is largest. In this case, the series MZ cannot provide as low a noise figure as the single MZ at quadrature (which has $c_1$=0.5, r=0). The dynamic range of the series MZ is still larger than that of the single MZ, even though $c_0 M_{IP3}$ is smaller, because of the n=5 intermodulation product slope.

In the shot-noise-limited case, an optimization for the series MZ is $\phi_1 \rightarrow 180°$ with r<1; $\phi_2 \rightarrow 180°$ with r>1 is also an optimum choice. The noise figure is better than that of a single MZ at quadrature, showing the same 3 dB improvement as a single MZ with $\phi_1 \rightarrow 180°$. The noise figure in this limit is 13.5 dB better than that of the dual parallel MZ. The dynamic range is not only much larger than that of a single MZ, but it is also 8.6 dB larger than the dynamic range of a dual parallel MZ because $c_0 M_{IP3}^2$ is 12× larger (r=2 was used for the dual parallel MZ, which gives its optimum performance).

In the RIN-dominated case, the effect of the RIN noise term can be made arbitrarily small by optimizing the modulator parameters as described above for the shot-noise-limited case. This means that, as for the single MZ with $90° < \phi_1 < 180°$, the modulator can always be designed so that shot or thermal noise is the limiting link noise source (this does not mean that the performance level is always as good no post-amplifier would have approximately these parameters.) For r near 1, the link is shot noise dominated. At large or small r the average detector current becomes very small, receiver noise dominates, and the link performance falls. The highest gain is achieved near r=1, but the best noise figure and dynamic range are achieved away from R=1.

Figure 8A:
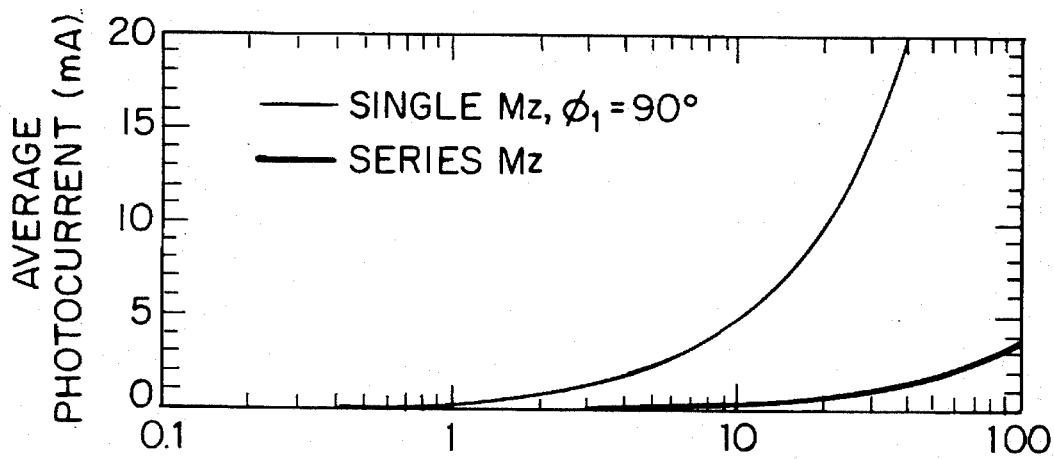
FIGS. 8A and 8B are performance comparisons of a link using a dual series interferometer, $\phi_1=60°$, $\phi_2=153.61°$, and r=3.16 with a link using a single interferometric MZ modulator biased at both the standard $\phi_1=90°$ and at $\phi_1=157°$.
Figure 8B:
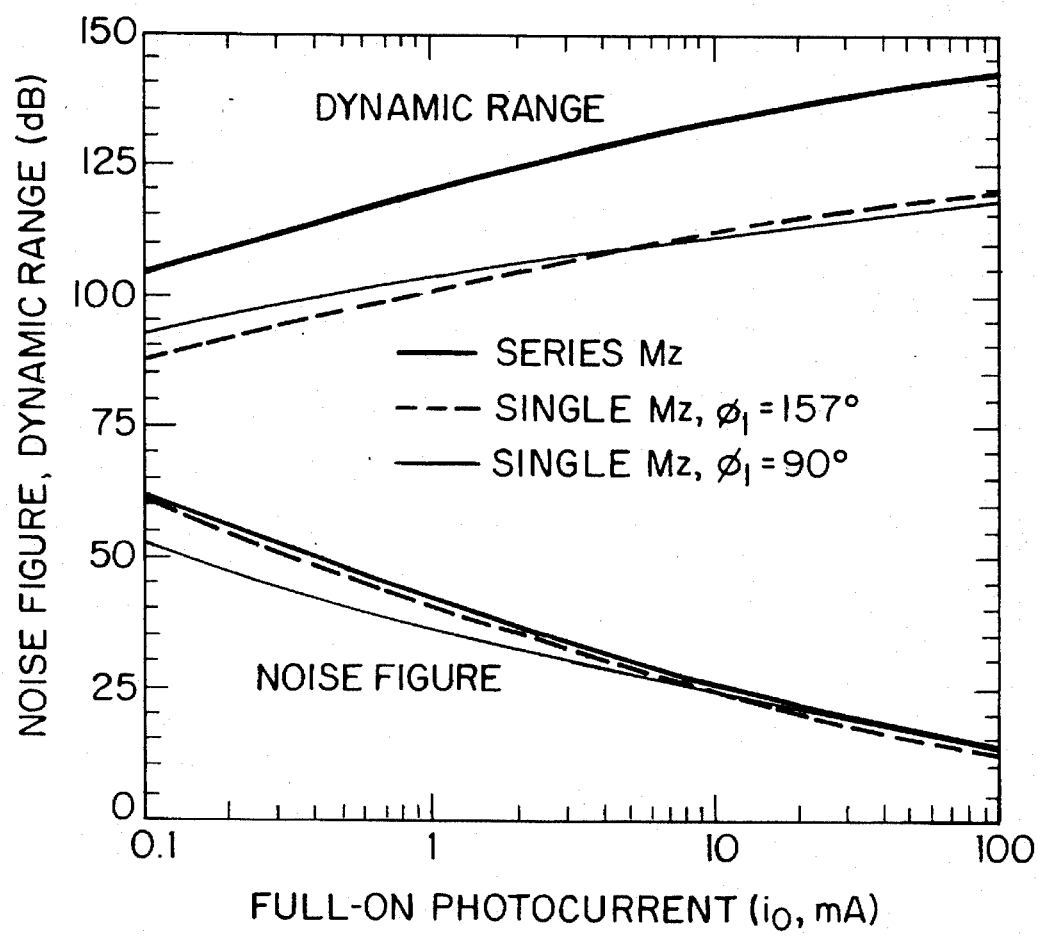

FIGS. 8A and B show how a particular series MZ design (r=3.16, $\phi_1$=60°, $\phi_2$=153.61°; a near-optimum choice for $i_0$=50 mA) compares with a signal MZ for various values of $i_0$. The dynamic range is larger everywhere. The noise figure is smaller than for the single MZ with $\phi_1$=90° at high $i_0$ where receiver noise is smaller than shot noise (if one were interested in using a series MZ at low $i_0$, a design with r=1 could reduce the noise figure penalty to the 6 dB evident in the Table in the receiver-noise-limited case). The noise figure is about 1 dB worse than the single MZ biased at $\phi_1$=157° (chosen because it has the same $c_0$ as the series MZ design). Even though the series MZ can reach the same noise figure as the signal MZ with $90° < \phi_1 < 180°$ in the pure shot-noise-limited case, when both receiver noise and shot noise are present the series MZ does not provide as good a noise figure as the single MZ with $90° < \phi_1 < 180°$. If RIN were present in this example, the noise figure of the single MZ biased at 90° would be increased by a much greater factor than that of the series MZ.

Figure 9:
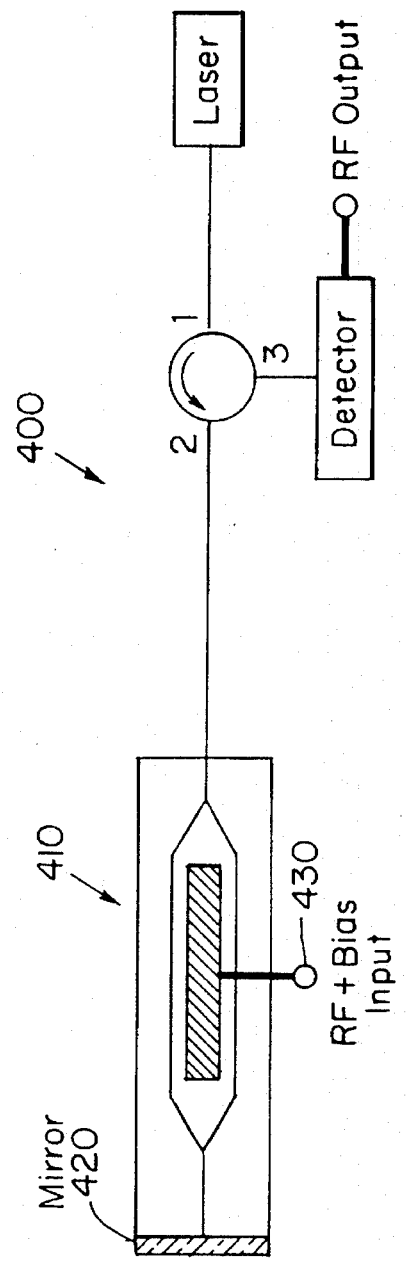
FIG. 9 is a schematic diagram of a second embodiment Mach-Zehnder modulator of the present invention.
Figure 7A:
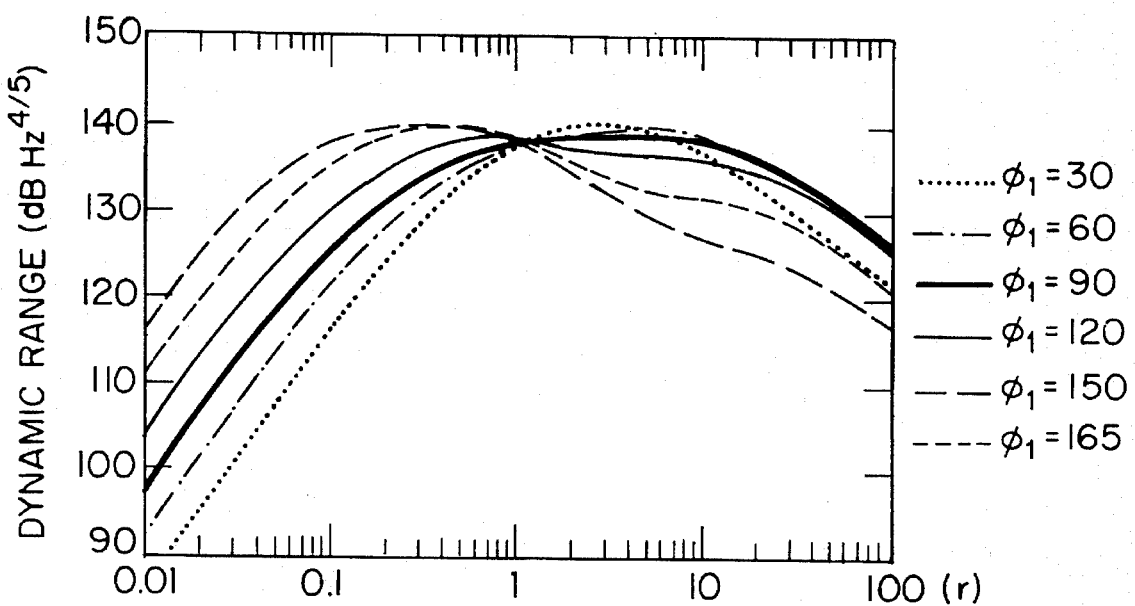
FIGS. 7A–7D show the effect of the modulator design on link performance, specifically.
Figure 7B:
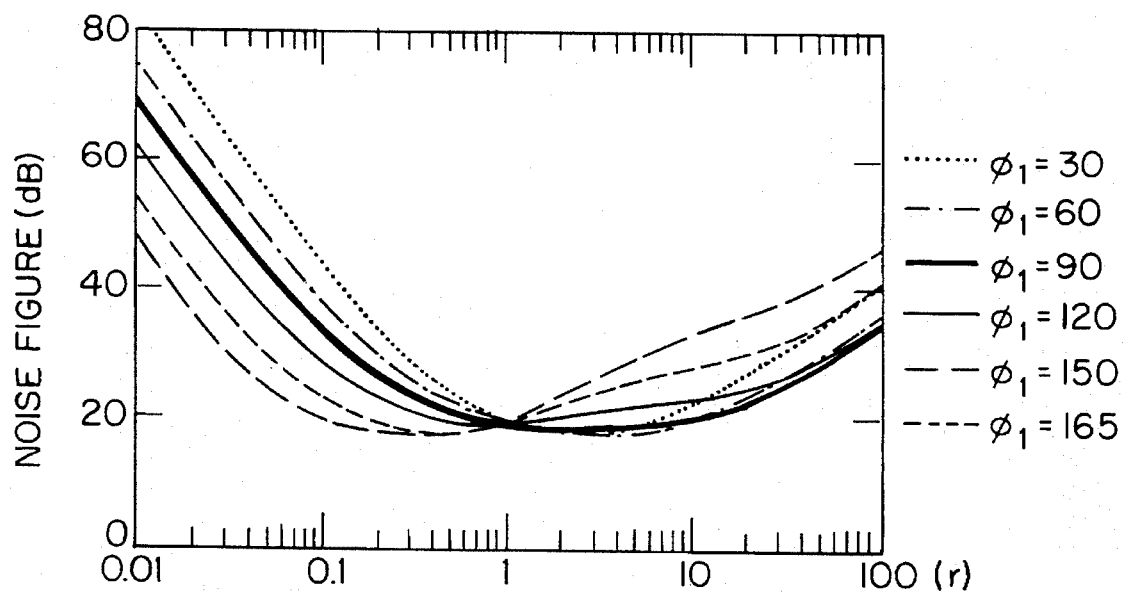
Figure 7C:
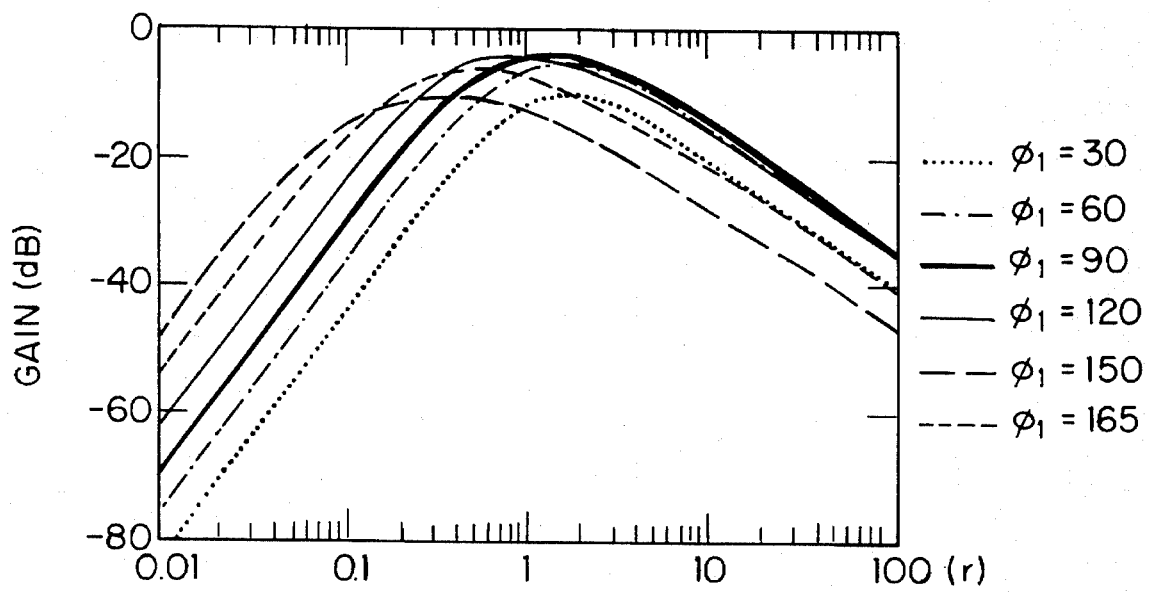
Figure 7D:
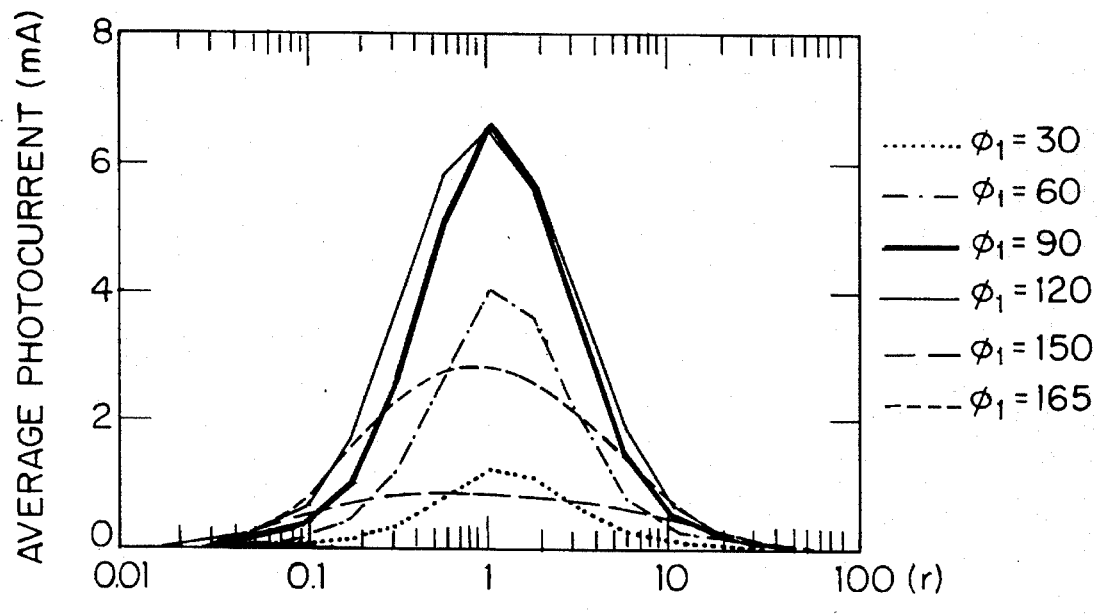

FIG. 9 shows a second embodiment 400 of the electromodulator constructed according to the principles of the present invention. Basically, the cascaded Mach-Zehnder interferometers have been replaced with a single Mach- Zehnder interferometer 410 and a mirror 420. Essentially, the mirror 420 directs the optical carrier signal to pass through the interferometric modulator 410 twice, effectively achieving the dual modulation of the cascade modulators. This duplicates the cascade architectures but requires only a single RF drive 430.

In one example, the modulator 400 is fabricated using titanium-indiffused lithium niobate ($LiNbO_3$). The mirror 420 was a gold-coated lithium niobate block attached with ultra-violet curing epoxy. The preferred bias point for the modulator is out of quadrature (90°). Specifically, a bias point of 104.5 degrees, 14% D.C. optical transmission, achieves minimum-third-order distortion. As expected, second-order distortion will be present but is out of band. At 150 MHz, the noise figure of 6 dB was achieved with a resonant impedance-matching circuit connected to a 36 mm long modulator electrodes. In a two-tone intermodulation test, third-order intermodulation signal fell as the fifth degree of the input power. The intermodulation-free dynamic range was 85.5 dB for a one MHz noise bandwidth. The bandwidth-normalized dynamic range was 134 dB-$Hz^{4/5}$.

This reflective version 400 of the cascade modulators is useful at frequencies up to roughly 2 GHz. The limitation is at the second modulator in the cascade MZ 200 is driven by an RF signal that is delayed from the first modulator drive by the time it takes the light to propagate from the first modulator to the second. No RF delay can be introduced in the reflective modulator 400. This error increases as frequency and length.

While this invention has been particularly shown and describe with references to preferred embodiments thereof, it will be understood by those skilled in the art that various changes in form and details may be made therein without departing from the spirit and scope of the invention as defined by the appended claims.

We claim:

1. An electro-optical modulation device, comprising:

an electro-optical modulator for intensity modulating an optical carrier signal in response to an electrical information bearing signal;

a reflective termination for reflecting at least a portion of the intensity modulated optical carrier signal to travel back through the electro-optical modulator.

2. A modulation device as described in claim 1, further comprising a directional coupler for coupling the optical carrier signal into the electro-optical modulator and for isolating the intensity modulated optical carrier signal from the electro-optical modulator on an output link.

3. A modulation device as described in claim 2, wherein the directional coupler is a optical circulator.

4. A modulation device as described in claim 1, wherein the electro-optical modulator is a Mach-Zehnder interferometric modulator.

5. A modulation device as described in claim 4, wherein the modulator is adapted to have balanced optical power in each arm.

6. A modulation device as described in claim 4, wherein a bias angle of the modulator is set to between 90°<ø<270°.

7. A modulation device as described in claim 4, wherein a bias angle of the modulator is set to between, 95°<ø<115°.

8. A modulation device as described in claim 4, wherein the bias angle of the modulator is approximately ø≅105°.

9. A modulation device as described in claim 1, wherein the modulator is tuned to minimize only third-order distortion.

10. A modulation device as described in claim 1, wherein a frequency range of second-order distortion introduced by the modulation device is outside a band of a fundamental.

11. A modulation device as described in claim 1, wherein the reflective termination linearizes the electro-optical transfer function of the electro-optical modulator.

12. An electro-optical modulation device comprising:

an electro-optical modulator for intensity modulating an optical carrier signal in response to an electrical information bearing signal;

a reflective termination for reflecting at least a portion of the intensity modulated optical carrier signal to travel back through the electro-optical modulator;

an electrical amplifier providing the information bearing electrical signal to the modulator;

a laser for generating the optical carrier signal;

an optical fiber cable for conveying the intensity modulated optical carrier signal, reflected back through the electro-optical modulator, between an antenna and a control facility; and an electro-optical detector for detecting the intensity modulated optical carrier signal transmitted through the optical fiber cable and converting the intensity modulated optical carrier signal into the electrical signal.

13. A modulation device as described in claim 12, wherein the electro-optical modulator is a Mach-Zehnder-type interferometric modulator.

14. A modulation device as described in claim 13, wherein the modulator is adapted to have balanced optical power in each arm.

15. A modulation device as described in claim 13, wherein a bias angle of the modulator is set to between 95°<ø<115°.

16. A modulation device as described in claim 13, wherein the bias angle of the modulator is approximately ø≅105°.

17. A modulation device as described in claim 12, wherein the electro-optical modulator is tuned to minimize only third-order distortion.

18. A modulation device as described in claim 12, wherein one of the first and the second modulators is biased between 90°<ø<270° to decrease total optical power.

19. A modulation device as described in claim 12, further comprising a directional coupler for coupling the optical carrier signal into the electro-optical modulator and for coupling the intensity modulated optical carrier signal into the optical fiber cable.

20. A modulation device as described in claim 12, further comprising an optical circulator.

21. A method of operation for an electro-optical modulation device, the method comprising:

transmitting an optical carrier signal between arms of the modulation device;

generating a relative phase shift between portions of the optical carrier in each arm of the modulation device in response to an information signal;

directing at least a portion of the optical carrier signal to travel back through the modulation device;

again dividing the optical carrier between the arms of the modulation device;

generating another relative phase shift between portions of the optical carrier in each arm of the modulation device in response to the information signal.

22. A method as described in claim 21, further comprising:

directionally coupling the optical carrier signal into the electro-optical modulation device; and isolating the intensity modulated optical carrier signal from the electro-optical modulation device on an output link.

23. A method as described in claim 21, further comprising providing balanced optical power in each arm of the modulation device.

24. A method as described in claim 21, further comprising providing a bias angle of the modulation device between $90° < \phi < 270°$.

25. A method as described in claim 21, further comprising providing a bias angle of the modulation device between $95° < \phi < 115°$.

26. A method as described in claim 21, further comprising conveying the intensity modulated optical carrier signal from the modulation device between an antenna and a control facility in an optical fiber cable; and detecting the intensity modulated optical carrier signal transmitted through the optical fiber cable and converting the intensity modulated optical carrier signal into an electrical signal.

27. A method as described in claim 21, further comprising linearizing an electro-optical transfer function of the modulation device by directing the optical carrier signal to travel back through the modulation device.

* * * * *